(12) United States Patent
Mao et al.

(10) Patent No.: US 10,769,022 B2
(45) Date of Patent: Sep. 8, 2020

(54) DATABASE BACKUP FROM STANDBY DB

(71) Applicant: ORACLE INTERNATIONAL CORPORATION, Redwood Shores, CA (US)

(72) Inventors: Tao Mao, Castro Valley, CA (US); Yanfei Fan, Fremont, CA (US); Wanding Li, Menlo Park, CA (US); Prasad V. Bagal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 107 days.

(21) Appl. No.: 16/164,665

(22) Filed: Oct. 18, 2018

(65) Prior Publication Data
US 2020/0125449 A1 Apr. 23, 2020

(51) Int. Cl.
*G06F 12/00* (2006.01)
*G06F 11/14* (2006.01)
*G06F 16/27* (2019.01)

(52) U.S. Cl.
CPC ...... *G06F 11/1448* (2013.01); *G06F 11/1464* (2013.01); *G06F 11/1466* (2013.01); *G06F 16/27* (2019.01)

(58) Field of Classification Search
None
See application file for complete search history.

(56) References Cited

U.S. PATENT DOCUMENTS 7,003,694 B1 * 2/2006 Anderson, Jr. ...... G06F 11/2023
707/999.202
2005/0262170 A1 * 11/2005 Girkar .................... G06F 16/27

OTHER PUBLICATIONS

Gu, Lijun et al. "DB2 UDB Backup and Recovery with ESS Copy Services", Aug. 2002, pp. 1-144, IBM RedBooks, from https://wvvw.redbooks.ibm.com/redbooks/pdfs/sg246557.pdf.
Visser, Arjen. "Apply Logs on Standby System with Time Delay or Lag", Mar. 2017, pp. 1-2, from https://support.dbvisit.com/hc/en-us/articles/216779997-Apply-Logs-on-Standby-System-with-Time-Delay-or-Lag.
Redgate, "Failing Over to a Standby Server", Redgate SQL Backup 9, Mar. 2017, pp. 1-4, from https://documentation.red-gate.com/sbu9/log-shipping/failing-over-to-a-standby-server.
Esri, "Using ArcSDE With Microsoft SQL Server Log Shipping and Standby Servers", May 2004, ESRI Technical Paper, pp. 1-19, from http://downloads.esri.com/support/whitepapers/sde_/J9208_MS_SQL_Standby_Servers.pdf.
Khatri, Vikram S. "DB2 Night Show DB2 10.1 HADR", Jun. 2012, IBM Corporation, pp. 1-35, from https://www.dbisoftware.com/db2nightshow/20120608DB2Night84.pdf.

(Continued)

*Primary Examiner* — Jason W Blust
(74) *Attorney, Agent, or Firm* — Vista IP Law Group, LLP

(57) ABSTRACT

Disclosed is an improved system, method, and computer program product for generating backups in a database system. This is accomplished by using a disaster recovery infrastructure of a database system to generate the database backup, where the backup activities are performed on a standby database system, thereby freeing up the primary database system. To avoid authorization/authentication requirements between the primary and standby that may require human intervention to type passwords when backups are performed on the standby, a backup solution is provided that does not require human intervention to enter passwords when automating the backup process.

18 Claims, 12 Drawing Sheets

(56) References Cited

OTHER PUBLICATIONS

Oracle Corporation, "Back Up and Recover an Oracle Database 12c Database on an Azure Linux Virtual Machine", Aug. 2018, Microsoft Azure, pp. 1-36, From https://docs.microsoft.com/en-us/azure/virtual-machines/workloads/oracle/oracle-backup-recovery.
Rich, Kathy et al. "Concepts and Administration", Oracle Data Guard, Feb. 2014, pp. 1-336, from https://docs.oracle.com/cd/E11882_01/server.112/e41134.pdf.
Oracle Corporation, "Redo Apply Best Practices", Oracle Active Data Guard, Aug. 2018, Oracle Maximum Availability Architecture White Paper, pp. 1-27, from https://www.oracle.com/technetwork/database/availability/redo-apply-2745943.pdf.
Oracle Corporation, "Oracle Best Practices for High Availability", Oracle Active Data Guard, Sep. 2011, Oracle Maximum Availability Architecture White Paper, pp. 1-49, from https://www.oracle.com/technetwork/database/features/availability/maa-wp-11gr1-activedataguard-1-128199.pdf.
DellEMC, "Oracle Database Backup, Recovery, and Replications Best Practices With Vmax All Flash Storage", Jan. 2018, VMAX Engineering White Paper, pp. 1-114, from https://www.dellemc.com/ko-kr/collaterals/unauth/white-papers/products/storage/h14232-oracle-database-backup-recovery-vmax3.pdf.
EMC Corporation, "Oracle Database Backup and Recovery With Vmax3", Jun. 2015, VMAX Engineering White Paper, pp. 1-43, from https://www.dell.com/community/s/vjauj58549/attachments/vjauj58549/solutions-ch/515/1/h14232-oracle-database-backup-recovery-vmax3.pdf.
"15 Backup and Recovery Concepts", pp. 1-40, from https://cdn.ttgtmedia.com/searchOracle/downloads/ch15.pdf.
EnterpriseDB Corporation, "EDB Postgres Backup and Recovery Guide", Oct. 2017, pp. 1-59, from https://get.enterprisedb.com/docs/EDB_Postgres_Backup_and_Recovery_Guide_v2.0.pdf?_ga=2.203517586.386143277.1539003668-1604119527.1537200193.
Ashdown, Lance et al. "Backup and Recovery Concepts", Oracle9i, Mar. 2002, Oracle Corporation, pp. 1-124.
Ashdown, Lance et al. "Recovery Manager Reference", Oracle9i, Mar. 2002, Oracle Corporation, pp. 1-292.
Strohm, Richard et al. "Oracle Real Application Clusters", Oracle Administration and Deployment Guide, 12c Release 1, Jul. 2017, pp. 1-502.
Agarwal, Pankaj. "SQL Server 2000 Backup and Restore", Feb. 2005, Microsoft TechNet, pp. 1-60.

\* cited by examiner

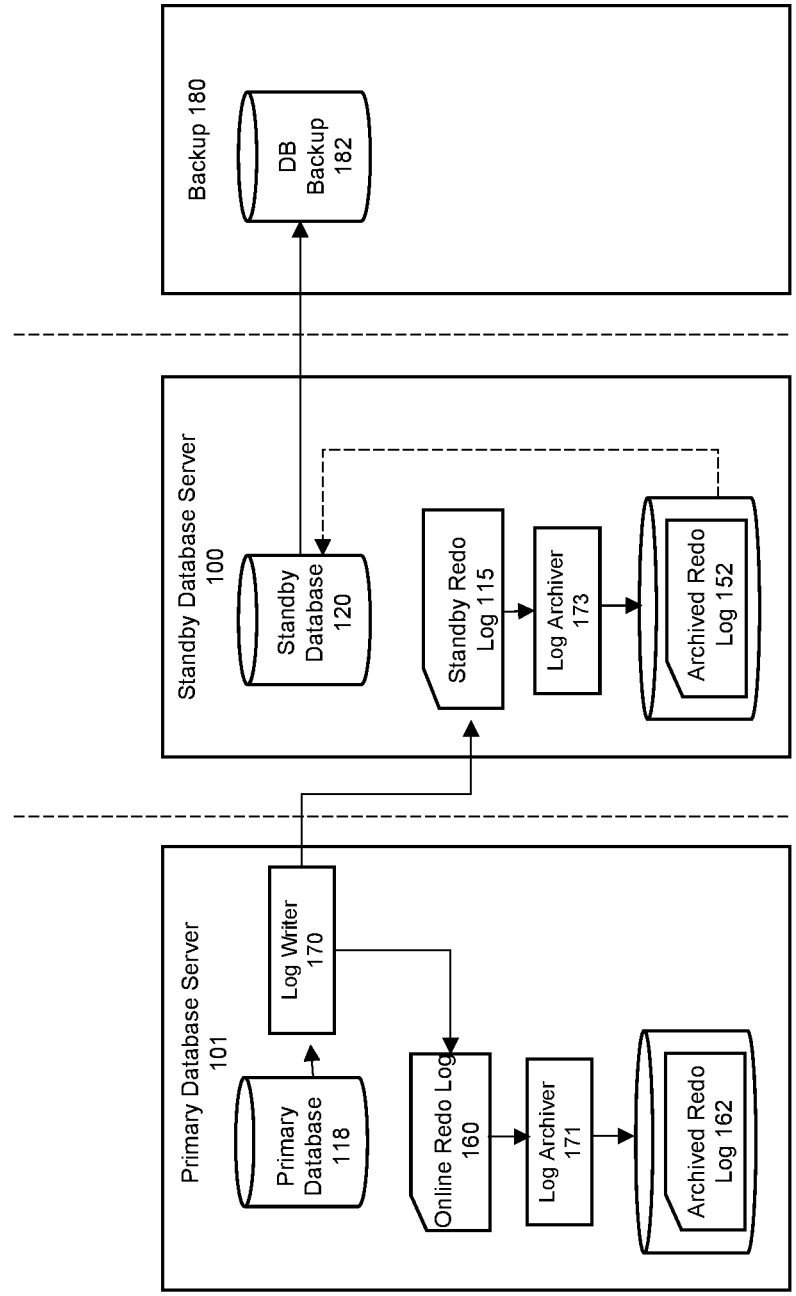

DATABASE BACKUP FROM STANDBY DB

BACKGROUND

Many computing environments need to generate data backups on a periodic basis. The backup generally makes a copy of a set of data to a secondary storage device and/or location. The backup is performed to make sure that adequate data retention is performed for a set of data within the system.

There are many reasons for performing data backups. For example, a common reason to generate backups is to provide data loss prevention in the event of system failure, corruption, or malware attack. Another reason is to maintain a set of data that can be tracked for analysis or auditing purposes. The backups can also be used for archiving purposes. In a database environment, it is very common to create backups of the content within a database. For a relational database system, the database backup will typically include a copy of all database tables that exist within the database.

When performing a backup, the computing system needs to incur certain costs and resource consumption requirements. For example, during the time a backup is occurring, certain activities on the system may need to be stopped to allow the backup process a conflict-free way to access the necessary data to copy into the backup. One problem is that this processing may therefore cause latencies to occur for any workloads that are delayed because of the backup processing. The system performing the backup may also need to consume additional resources (such as system memory and processor) to implement the backup processing activities, causing further contention for resources at the computing node. For a mission critical database system, these delays and resource conflicts associated with backup activities can be very costly for ongoing workloads. Moreover, if the backup procedure is managed at second computing node that is different from a first computing node that is managing the data to be backed up, then due to different authentication/authorization requirements at the multiple nodes, this may create a barrier to being able to automate the backup activities since human intervention may be needed to handle any required authentication activities.

What is needed, therefore, is a method and/or system that overcomes these problems, and which more efficiently implements backups for a database system.

SUMMARY

According to some embodiments, an improved system, method, and computer program product is provided for generating backups in a database system. This is accomplished by using a disaster recovery infrastructure of a database system to generate the database backup, where the backup activities are performed on a standby database system, thereby freeing up the primary database system. In addition, the current backup solution does not require additional/excessive password entry when automating the backup process.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, an improved system, method, and computer program product is provided to generate backups in a database system. In some embodiments, this is accomplished by using a disaster recovery infrastructure of a database system to generate the database backup, where the backup activities are performed on a standby database system, thereby freeing up the primary database system to continue performing mission critical transactional work without interruption. To avoid authorization/authentication requirements between the primary and standby (e.g., which may require human intervention to type passwords when backups are performed on the standby), a backup solution is provided that does not require additional entry of passwords between the standby and the primary when automating the backup process.

Figure 1:
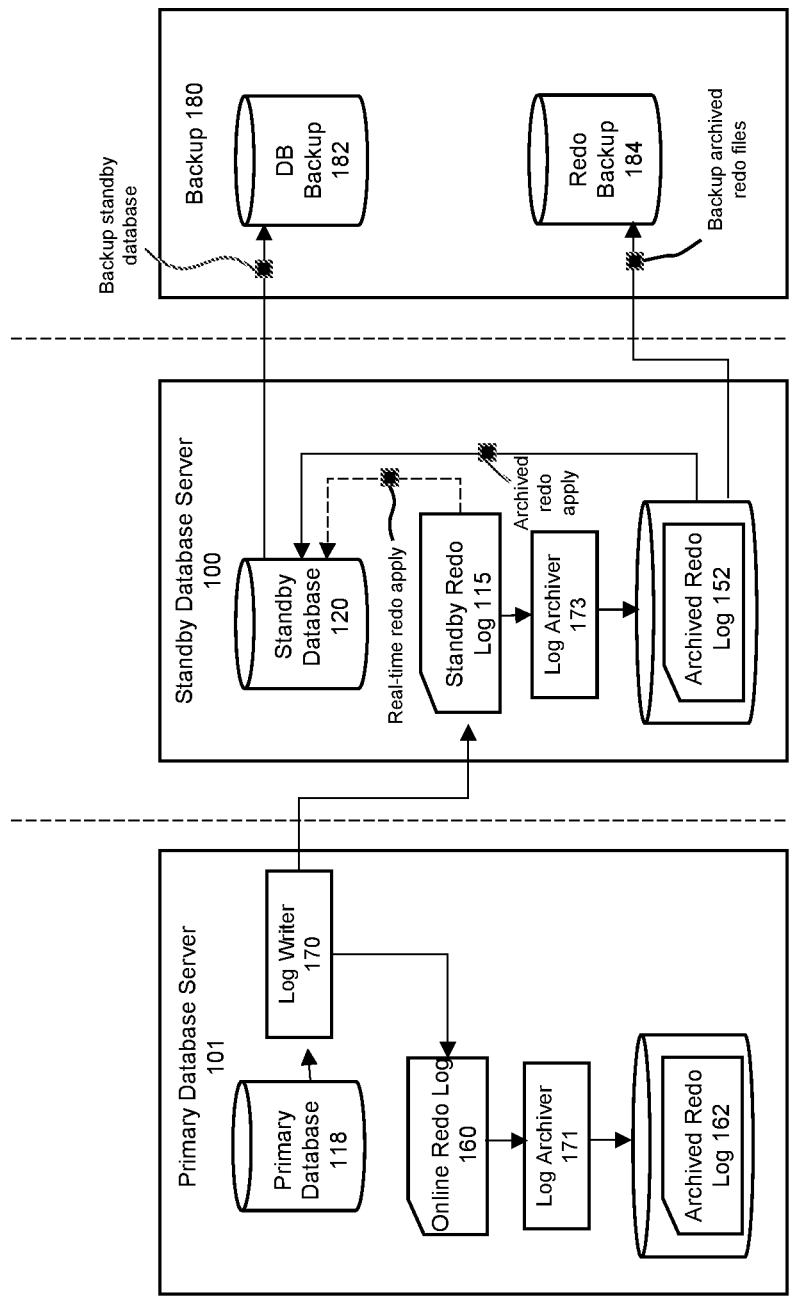
FIG. 1 illustrates a system for implementing some embodiments of the invention.

FIG. 1 illustrates a system for implementing the invention according to some embodiments. For illustrative purposes, this figure shows a database system that includes a primary database server 101 on which a primary database 118 resides. The system also includes a mechanism to implement a standby database 120 on a standby database server 100. A standby database is a replica of a primary database, where the standby database may be created to protect against disasters or data corruption that occur to the primary database, and/or to allow for supplemental reporting that occur at the standby. For example, if a primary database is destroyed or if data stored in the primary database is corrupted, a failover may be performed such that a standby database becomes the new primary database. As another example, many reporting applications execute on standby databases to offload computer processing from the primary since the data between the standby and the primary are generally synchronized. Some of these reporting applications require the data on the standby to be as close to or as near identical to the primary as possible.

For purposes of disaster recovery, redo records can be used to allow any changes that occur at a primary database to be replicated to a standby database. Disaster recovery is an approach which often provides the ability to implement a "fail over", which is an immediate (and often seamless) hand-off of work from a primary operating environment to a secondary (standby) environment in the event of a disaster at the primary operating environment. In contrast, backups are generally implemented for data retention, and as such, the backups can often be placed into storage media and offsite locations that are not "live" systems that can implement failover processing on an immediate basis.

A standby database can be maintained by applying redo records from the primary database to the standby database. Redo records describe changes to data stored in a database, and are generated when these changes are made in the primary database. For example, if one or more rows of data in a table stored in the primary database is updated, then redo records are generated that describe how those rows changed in the table.

The primary database 118 may generate redo records that are stored in one or more types of redo logs at the primary database server 101. In particular, the redo files may be stored in an online redo log 160 or an archived redo log 162. The online redo log 160 is, in some embodiments, maintained as a circular buffer in a storage device that corresponds to relatively higher levels of access performance (e.g., in memory, persistent memory, or a solid state device (SSD)). In contrast, the archived redo log 162 corresponds to log files stored in storage devices that may have lower levels of access performance as compared to the online redo log (e.g., in SSDs or hard disk drives). The reason the online redo log is often maintained as a circular buffer is because of the limited amount of space that is often allotted to this type of log file, and hence as online redo log files are filled up, a log archiver 171 then transfers the records into the archived redo log 162.

On a periodic basis, a log writer component 170 may operate to copy and transfer redo records from the primary DB to the standby DB. At the standby server 100, the received copies of the redo records are placed into a standby redo log 115. The redo records are used to reconstruct changes made to the contents of the primary database which are applied to the standby database 120 to maintain the standby in synchronization with the primary. In some embodiments (e.g., for "physical replication"), the redo records correspond to changes made to the contents of a database on a block-by-block basis, and thus, application of the redo records at the standby database creates physical copies of data blocks from the primary database. This means that when redo records are generated in response to logged changes made to the contents of a primary database, these records are sent to a standby database where the same changes are made to ensure that the contents of the standby database remain identical to those of the primary database. In this way, if a disaster occurs at the primary, then a failover operation can be implemented to allow the system to continue handling work from the standby system.

The standby database server 100 also includes two types of redo logs. The standby redo log 115 hold individual redo records as they are received from the primary. As these redo records accumulate to fill up a container (e.g., a redo log file) within the log, the filled-up file is then placed into the archived redo log 152 by a log archiver 173.

There are at least two possible ways that redo records are applied to the standby database 120 to maintain synchronization between the standby and the primary. In some embodiments, there is a wait for a full archived redo file to be created before applying it to the standby database. In addition, "real time apply" can be imposed, which applies the redo data as it is received at the standby from the primary, without waiting for the current standby redo log file to be archived. This results in faster failover times, since the standby redo log files have been applied already to the standby database by the time the failover begins.

In some embodiments of the invention, the disaster recovery infrastructure within a database system is used to generate a backup of the database. In particular, a backup 180 is generated from backup activities performed on the standby database server 100 instead of the primary database server 101. This approach therefore frees up the primary database system to continue performing transactional work without interruption.

One possible approach to generate the backup 180 can be implemented by performing the following sequence of steps: (1) perform a "switch" of the online redo log at the primary, which essentially causes an immediate transfer of a redo log file from the online redo log to the archived redo log at the primary, with a corresponding transfer at the standby of the standby redo log to the standby archived redo log file; (2) perform a backup of the archived redo log at the standby; (3) perform a backup of the database at the standby; (4) perform another switch of the online redo log; and (5) perform another backup of the new archived redo log. The reason steps (4) and (5) are performed (which repeat steps (1) and (2)) is because the actions of step (3) to perform a backup of the standby database may take an extended period of time if there is a large amount of data to backup, and hence the additional steps are repeated to perform a backup of any additional changes that may have occurred in the intervening period of time.

However, a distinct drawback with this approach is that the steps to perform a switch of the online redo log at the primary may require additional authentication/authorization actions when the backups are initiated from the standby (e.g., involving human intervention to type passwords). This is because the switch operation often requires a high enough level of authentication/authorization such that admin level permissions must be obtained to perform this action, which when performed from the standby to the primary, often requiring a human to type a password into the system to perform this operation. As such, this approach is problematic if there is a desire to be able to automate the backup processing and to eliminate the need for human intervention to authenticate the backup operations.

Figure 2:
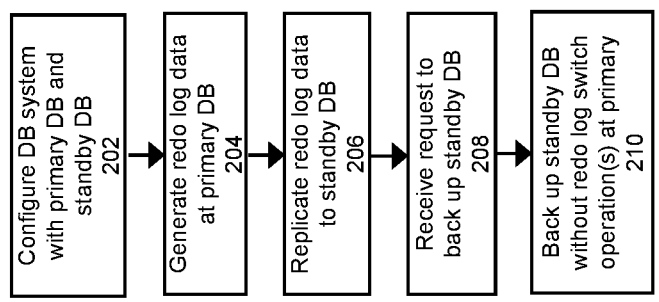
FIG. 2 shows a high level flowchart of an approach to implement some embodiments of the invention.

FIG. 2 shows a high level flowchart of an approach to implements backups according to some embodiments of the invention, which provides a backup solution that solves this problem and which does not require human intervention to enter passwords when automating the backup processing.

At 202, a database system is configured with a primary database server and a standby database server. For example, the database system may include the primary database server 101 and a standby database server 100 as shown in FIG. 1, where the primary database server 101 includes a primary database 118 and one or more redo logs 160 and 162, while the standby database server 100 includes a standby database 120 along with redo logs 115 and 152. The database may include one or more database tables.

An operation may be performed at the primary database, e.g., to apply one or more changes to a table in the primary database. The database tables may be operated upon by one or more clients within the system, where users at the clients operate a user station to issue SQL commands to be processed by the database upon the table. The user stations and/or the servers that host the database comprises any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

Database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command. A database "transaction" corresponds to a unit of activity performed at the database that may include any number of different statements or commands for execution.

At step 204, redo log data (e.g., redo records) are generated at the primary database. The redo records may be generated in conjunction with the processing of transactions that update or write to the primary database 118. The redo records may be placed into the online redo log 160, and later transferred into the archived redo log 162. The log records are generated for the operation that was performed at the primary database.

Logging (e.g., redo logging) is performed to record all modifications performed on the database before they are applied. One reason to implement logging is to ensure ACID (Atomicity, Consistency, Isolation, Durability) properties in the database system guarantee that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist. In some embodiments, write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability. The log records are maintained to allow suitable recovery operations in the event of a system failure or aborted transaction. Some common problems that could cause a system failure or aborted transaction include hardware failure, network failure, power failure, database instance failure, data access conflicts, user errors, and statement failures in the database access programs (most often written in the structured query language or SQL). Different types of transaction log records can be maintained in a database system. A common transaction logging strategy is to maintain redo records that log all changes made to the database. With "write ahead logging", each change to data is first recorded in a redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that has only occurred in cache, and have not been recorded to disk before the failure. If redo log have been properly maintained for these cache-only changes, then recovery can be performed by applying the redo records to roll the database forward until it is consistent with the state that existed just before the system failure. In a disaster recovery system, the redo records may also be used to synchronize a standby database with a primary database.

At 206, the redo records at the primary database server are replicated to the standby database server. A log writer may be employed to replicate the redo records from the primary database server to the standby database server. At the standby database server, the redo records are applied to the standby database to maintain synchronization with the primary database.

At 208, a request may be received to perform a backup of the database. For example, the request may pertain to the initiation of a "full backup", which seeks the generation of a backup copy of the entire database. The request is received for handling by the standby database server instead of the primary database server. Therefore, the actions to backup the database will be executed using the resources at the standby (e.g., software components, memory, and processor(s)) instead of the resources at the primary.

At step 210, a backup is created from the standby database. In the current embodiment, the backup is created without performing the switch operation(s) at primary database. By generating the backup without the switch operation, this allows the backup activities to occur on the standby without requiring human intervention to perform authorization/authentication at the primary.

Figure 3:
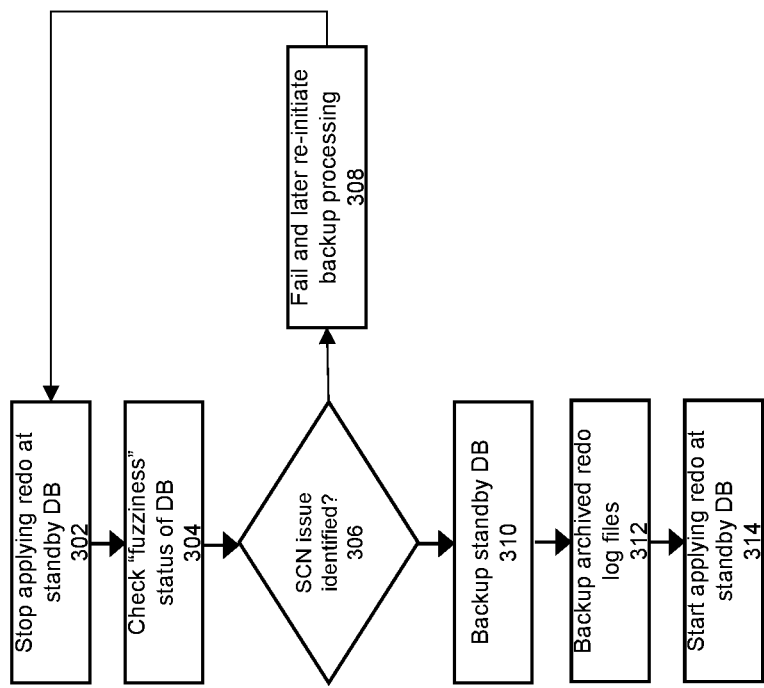
FIG. 3 shows a more detailed flowchart of an approach to implement some embodiments of the invention.

FIG. 3 shows a detailed flowchart of an approach to generate a backup from a standby database according to some embodiments of the invention. At 302, redo apply is stopped at the standby database. This means that for the duration of the backup processing, any redo records that have not already been applied to the standby will be blocked from being applied.

At 304, a check is performed of the "fuzziness" status of the standby database files. A datafile that contains a block whose System Change Number (SCN) is more recent than the SCN of its header is often referred to a fuzzy datafile. This means that the file contains blocks as of different points in time, providing an indicator that the file is not internally consistent. Essentially, if a file is fuzzy, then this is an indication that there is at least one block in the file as of SCN old_scn, and to make this datafile consistent, the database needs to bring all blocks in this file to be consistent as of SCN new_scn. There are numerous approaches that can be taken to check the fuzziness status of a file. For example, when operating on an Oracle database system, the following SQL statement can be used to check for a fuzzy file: "select count(*) from v$datafile_header where fuzzy='YES'".

At 306, a determination is made whether any of the database files to be backed up are fuzzy. If so, then at 308, the process fails out. The normal log apply processing then begins again. This means that the reo apply process restarts again to apply changes to the standby database from the redo records replicated from the primary. At a later point in time (e.g., after a designated wait period), another attempt can be made to generate the backup of the database, starting over again from step 302

The general idea is that an "optimistic" approach is taken to generate the backup, with the expectation that the vast majority of the time the standby datafiles will be internally consistent with respect to the SCN of its blocks. Therefore, since most of the time there are no fuzzy files, then most of the time backup processing can proceed normally without any fuzziness problems.

However, for the small percentage of the time that a fuzzy file is encountered, the backup processing fails out to allow additional redo applies to be performed. With another one or two cycles of processing, this should provide enough opportunity within the standby system for the fuzziness to be cleared up, so that the next time an attempt is made to generate a backup, the fuzziness check will not encounter any fuzzy files.

If the determination is made at 306 that no fuzzy files have been encountered, then at step 310, the processing will back up the standby database. As shown in FIG. 1, this creates a DB backup 182 within the backup 180. Essentially, this step copies all of the datafiles corresponding to the standby database 120 to the backup 180, where the datafiles include a plurality of files, each of the files corresponding to the data for one or more tables within a given one or more tablespaces. It is noted that this step may also involve copying of additional content that pertain to the standby database. For example, database control files and/or server parameter files may also be backed up at step 310. The control files provide information that specifies control parameters for the database, such as for example, information about the physical structure of the database such as names and locations of the datafiles and redo files.

At step 312, the archived redo files at the standby are backed up. As shown in FIG. 1, this creates a redo backup 184 within the backup 180, where the archived redo files within archive redo log 152 in the standby database 120 are copied to the backup 180.

At this point, the backup of the standby database has completed. Therefore, at step 314, the standby can now start redo applies again.

Figure 4A:
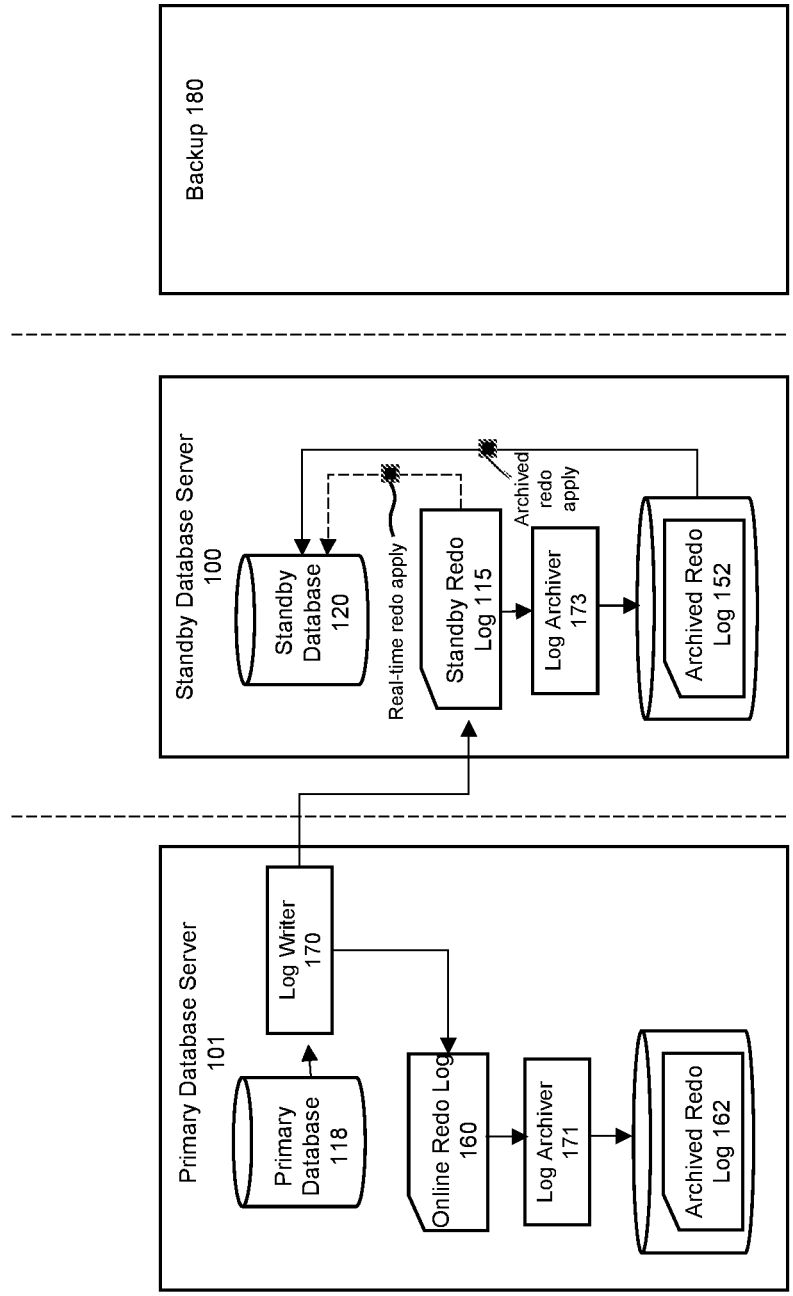
FIGS. 4A-4E provide an illustration of an approach to implement some embodiments of the invention.

FIGS. 4A-4E provides an illustration of this process. FIG. 4A shows the normal operating scenario, where work is being processed at the primary database, and redo records are generated at the primary in response that workload. The redo records generated at the primary are copied to the standby and placed into the standby redo log 115, which are archived as archived redo files within the archive redo log 152. These redo records are applied at the standby to synchronize the standby DB with the primary DB.

Figure 4B:
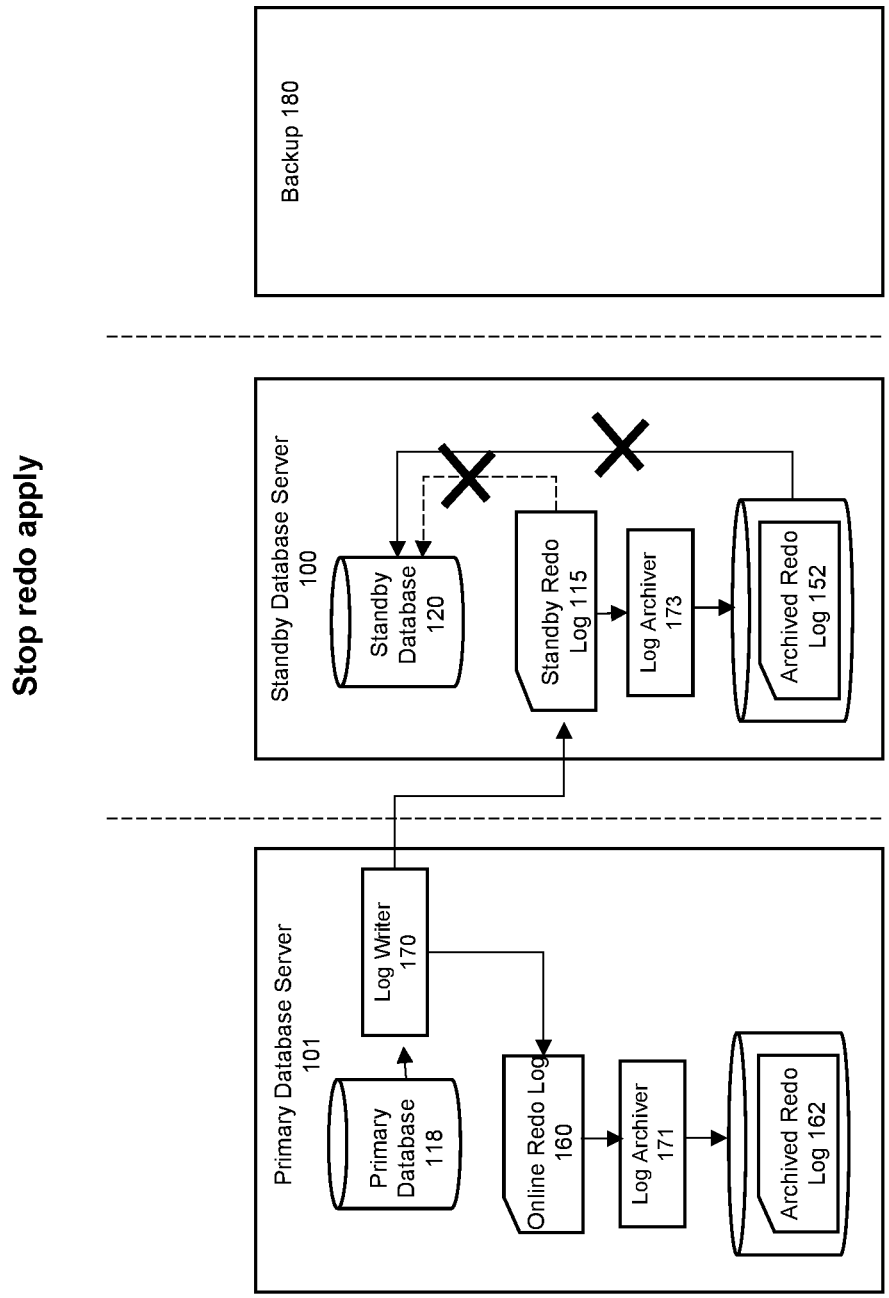

At some point in time, a request may be received to generate a backup of the standby database. As shown in FIG. 4B, redo apply is then stopped at the standby. This means that no further redo records are permitted to be applied to the standby database 120 at this time.

Figures 1, 4C:
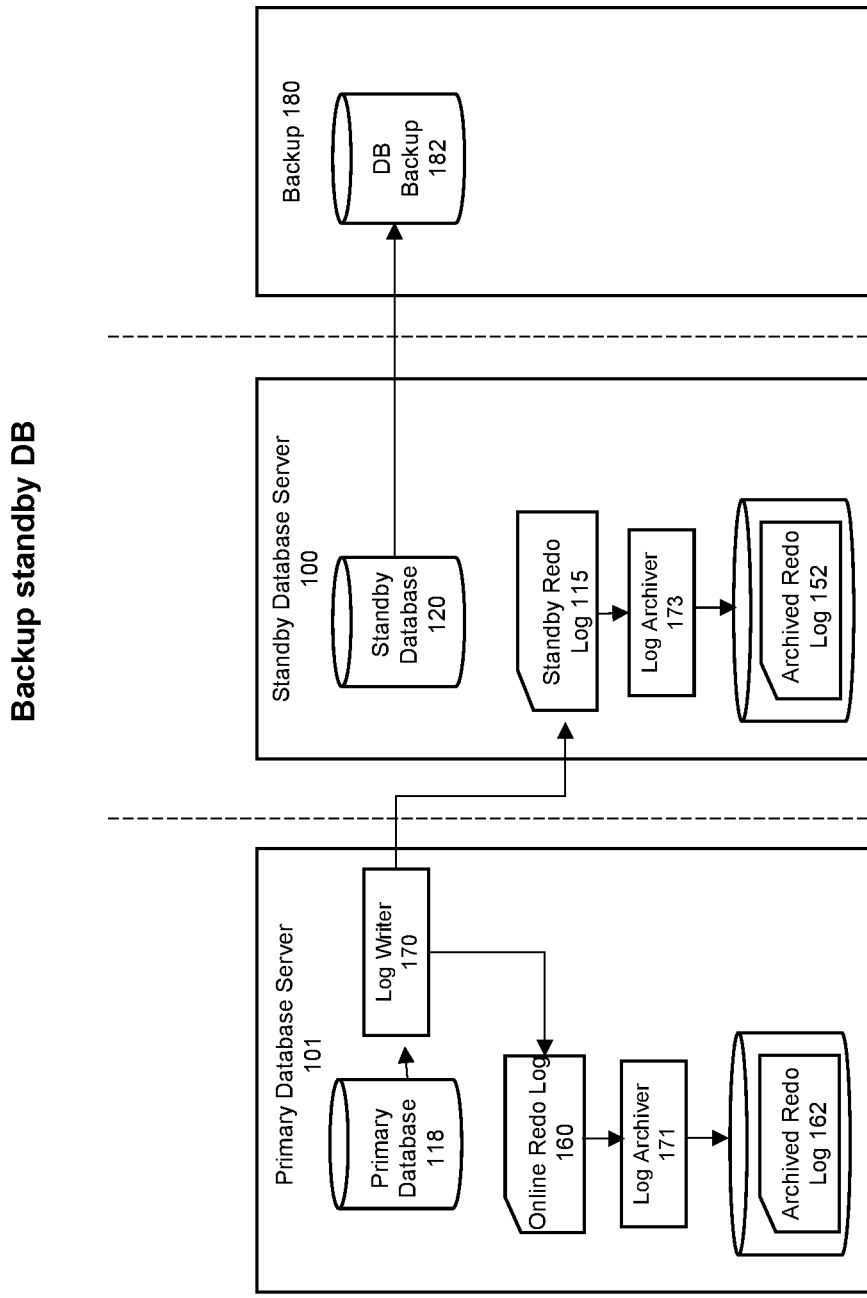
Figure 4D:
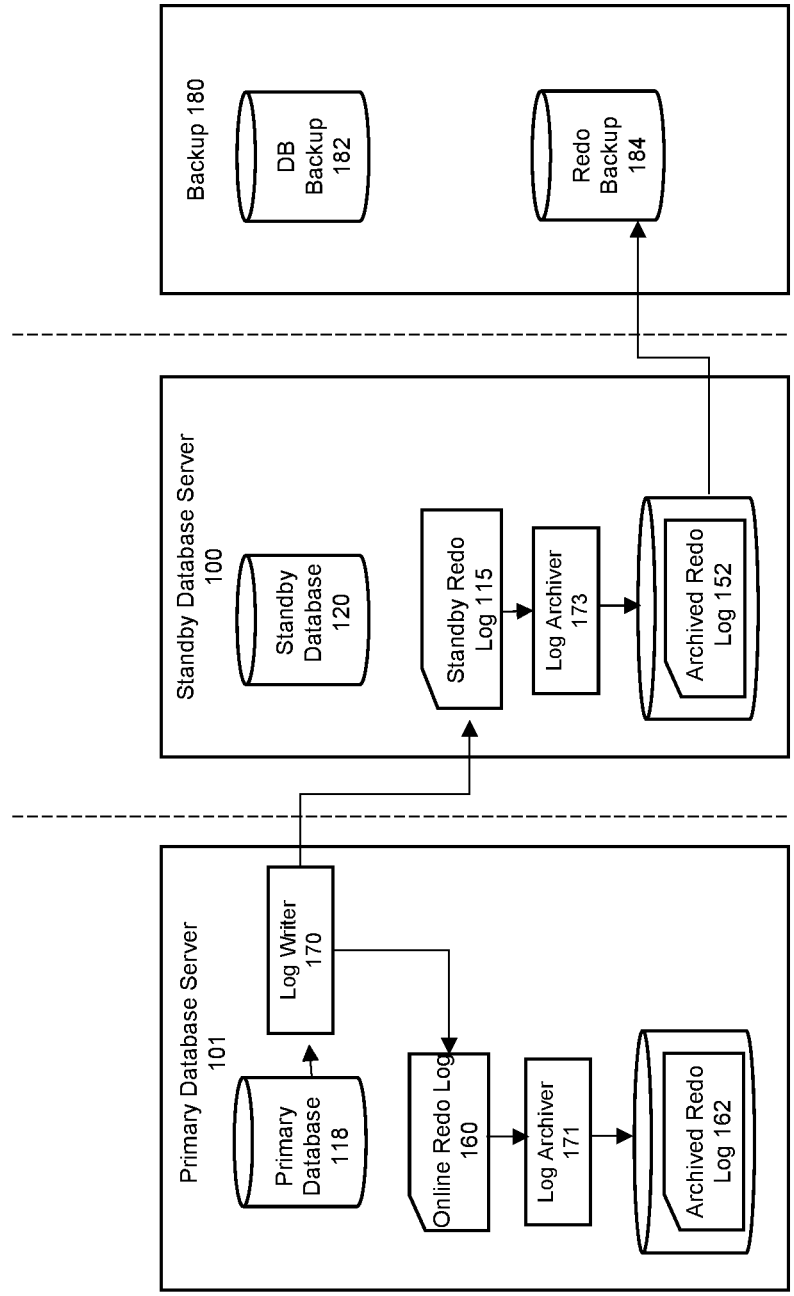

Assuming the datafiles at the standby are not fuzzy, backup processing can now proceed. As shown in FIG. 4C-1, the standby database 120 is now backed up to create the database backup 182 within the backup 180. This is accomplished by copying the datafiles for the standby database 120 to the backup 180. Additional content may also be copied as well, including control files and parameter files. Next, as shown in FIG. 4D, the archived redo log is backed up. This is accomplished by copying the log files in the archive redo log 152 to the redo backup 184.

Figure 4E:
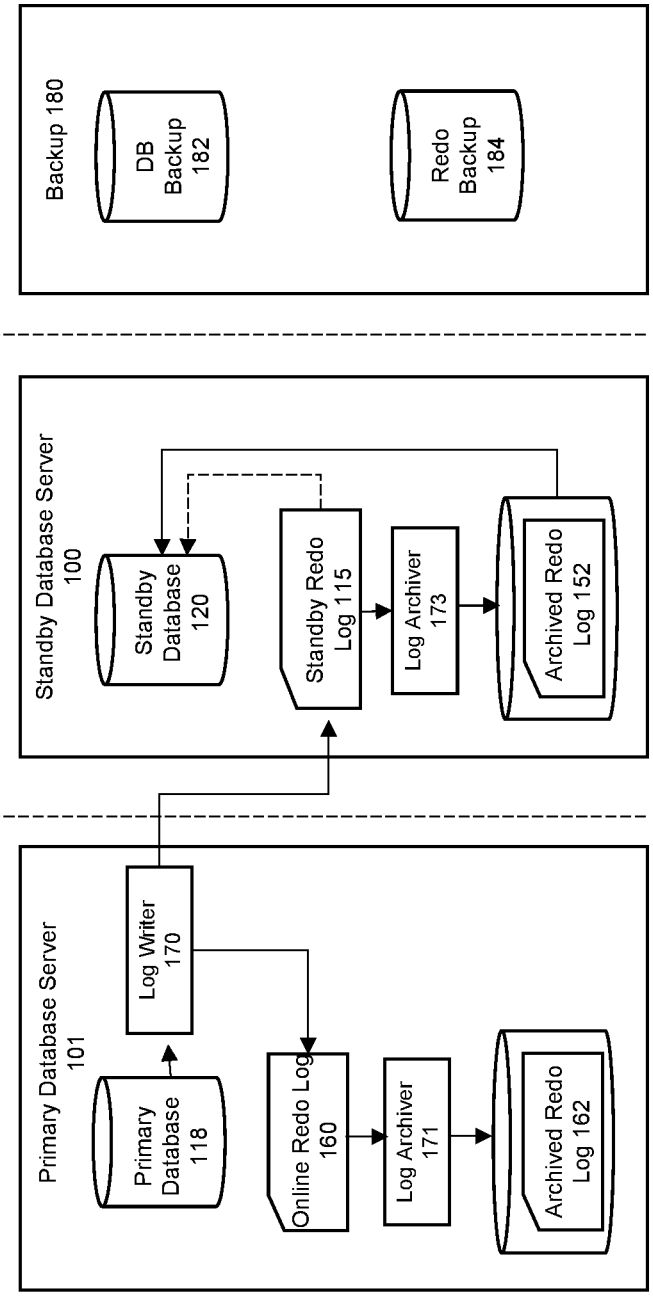

Since the backup of the standby database has now completed, normal operations at the standby can now resume. Therefore, as shown in FIG. 4E, the standby can now start redo applies again.

It is noted that this process to generate a backup did not require the use of a switch operation at the primary. This is because this sequence of steps did not require redo records in log 115 to be copied to the archived redo log 152 for the backup, and hence did not need a switch at the primary to trigger this copying. As such, all of the operations can be driven entirely from the standby. This approach therefore allows for implementation of a password-less database backup from the standby database. As such, the backup processing can be performed in an automated manner without human intervention.

Figure 5:
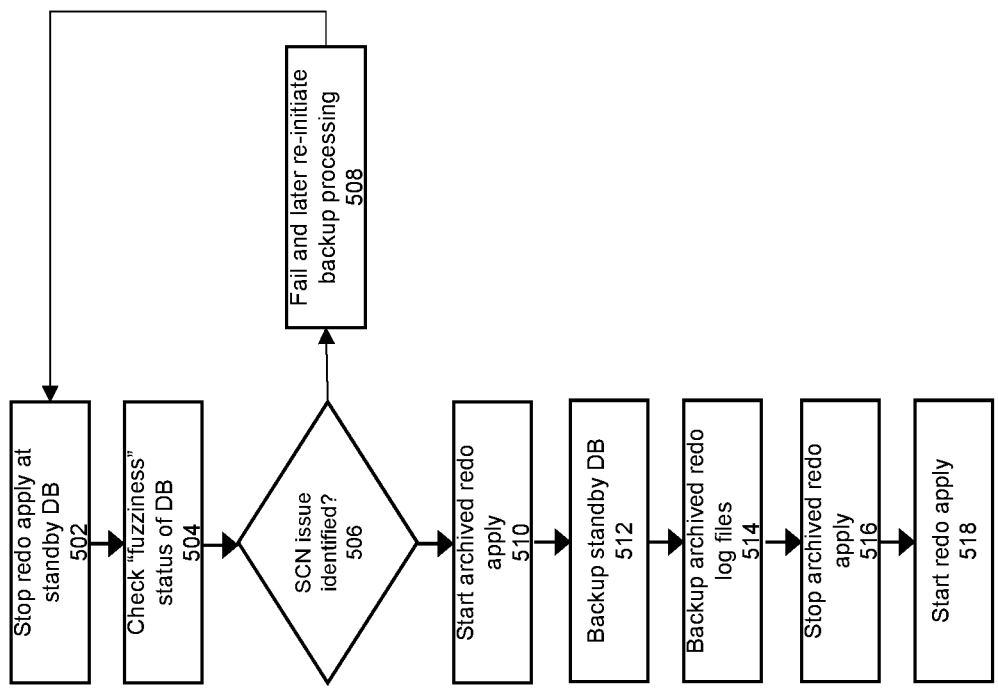
FIG. 5 shows a detailed flowchart of an alternate approach to implement some embodiments of the invention.

FIG. 5 shows a flowchart of an alternate approach to generate a backup at the standby. The reason for this alternate approach is to address the possibility that files become out-of-date during the backup processing time period. This issue is addressed in the approach of FIG. 5 by allowing archived redo apply to proceed during the backup.

At 502, redo apply is stopped at the standby database. This means that for the duration of the backup processing, application of the redo records to the standby will be blocked from occurring. This action may stop the application of real-time redo apply and/or the application of archived redo apply.

At 504, a check is performed of the fuzziness status of the standby database files. A determination is made at 506 whether any of the database files to be backed up are fuzzy. If so, then at 508, the process fails out. The normal log apply processing then begins again with the application of redo apply to the standby database. At a later point in time, another attempt can be made to generate the backup of the database, starting over again from step 502, e.g., after a designated wait period.

If the determination is made at 506 that no fuzzy files have been encountered, then at step 510, the standby will start the application of the archived redo log files. This will take any archived redo log files that have not already been applied, and apply them to the standby database when they are received at the standby.

Since the standby DB is being backed up during the same time period when the archived redo records are being applied to the standby database, this means that the possibility exists of certain inconsistencies (e.g., fuzzy datafiles) appearing in the standby database (and therefore in the DB backup 182) even though the fuzziness check has cleared in a previous step of the process flow. If this occurs (e.g., because the DB backup 182 reflects an intermediate state when an archive redo log file is only partially applied), then the archived redo log that is backed up to redo backup 184 can be used resolve the inconsistency at a later point in time.

At step 512, the backup processing will back up the standby database. This step copies all of the datafiles corresponding to the standby database 120 to the backup 180, where the datafiles include a plurality of files, each of the files corresponding to the data for one or more tables within a given one or more tablespaces. At step 514, the archived redo files at the standby are backed up. This copies the archived redo files within archive redo log in the standby database to the backup.

At this point, at step 516, the standby will stop applying the archived redo files to the standby database. At step 518, the previously stopped redo apply is started again. If the previous redo apply method is real-time redo apply, then this action will restart real-time redo apply. If the previous redo apply method is archived redo apply, then this action will restart archived redo apply.

The sequence of FIGS. 4A-E that was described above also correspond to the flow of FIG. 5. However, for the flow of FIG. 5, the action shown in FIG. 4C-2 is applicable instead of the action shown in FIG. 4C-1. FIG. 4C-2 illustrates the situation where archived redo apply is turned on during the database backup.

Therefore, what has been described is an improved approach to generate backups of a standby database. This approach eliminates the need for human intervention to type a database password when taking backup from the standby database. Instead, full automation of database backup can be implemented, while guaranteeing that the backed-up database is consistent and usable for database recovery. With the present embodiment of the invention, database passwords do not need to be stored or synchronized across the distributed database environment. Moreover, the resulting automation process does not need to deal with accompanying security measures for storing and synchronizing passwords. This approach also provides the convenience of eliminating online redo log switches at the primary database. In addition, this approach resolves any fuzziness problems that may arise for the backed-up database, while making the backup consistent and usable for database recovery. In addition, by backing up the standby rather than the primary, this approach maintains high-availability of the database for any transaction work that is to be executed in the database system. This approach is applicable to any database processing environment, such as backups in the cloud, on-premise, and/or hybrid environments.

System Architecture Overview

Figure 6:
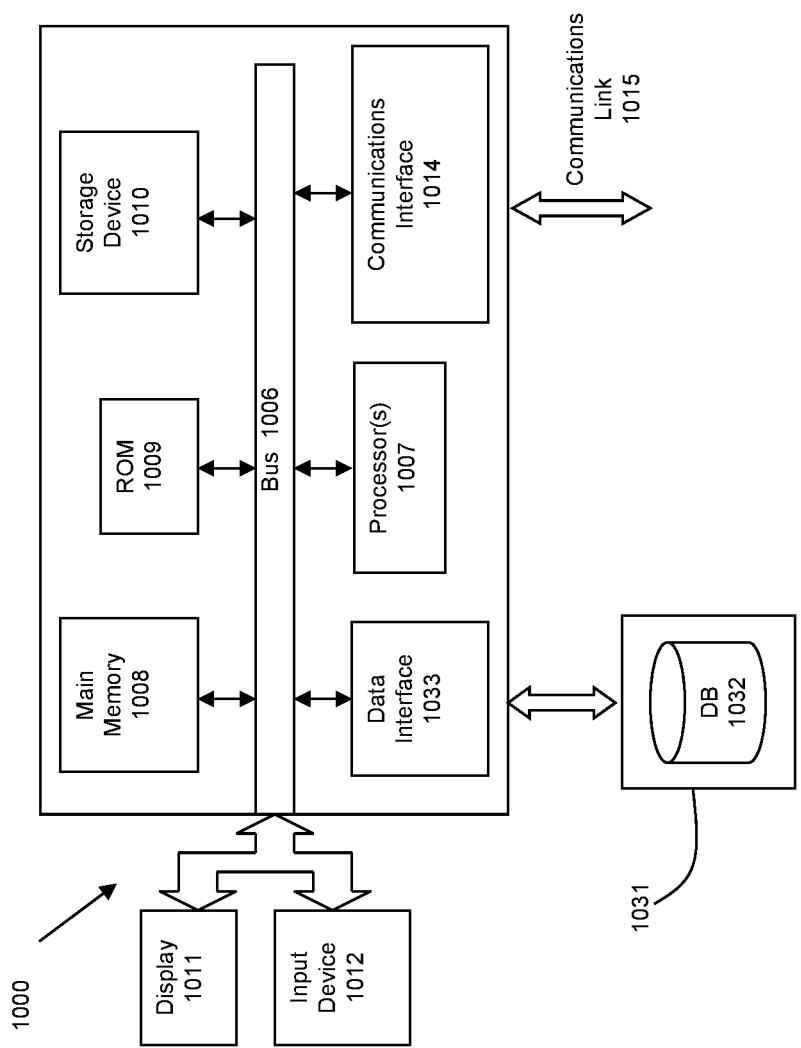
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
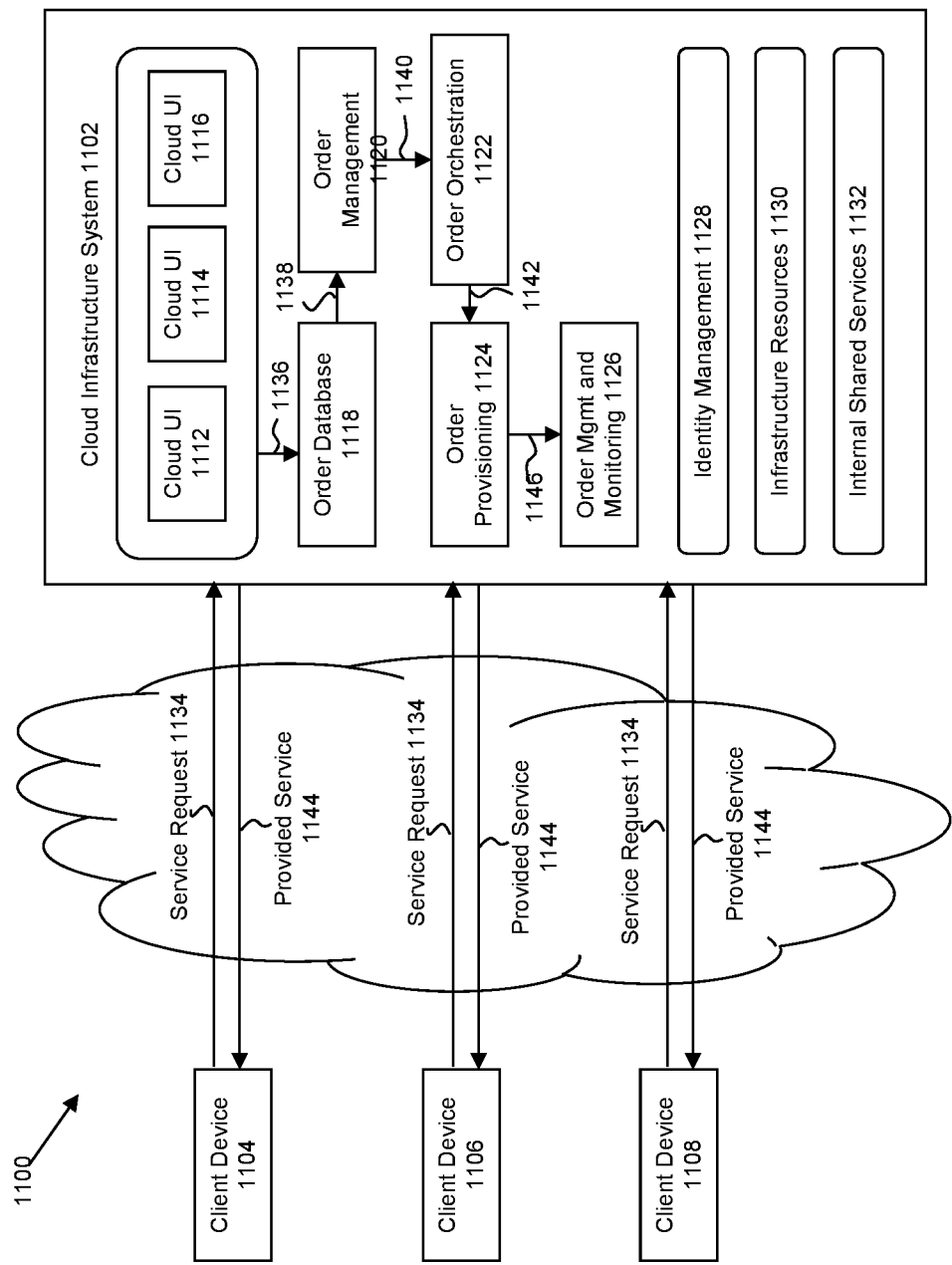
FIG. 7 is a block diagram of one or more components of a system environment in which services may be offered as cloud services, in accordance with an embodiment of the present invention.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for backing up a database, comprising:
maintaining a database system having a primary database and a standby database, the primary database generating redo records that are copied to the standby database;
receiving a request to back up the standby database; and
backing up the standby database by copying standby database datafiles and archived redo log files to a backup storage device,
wherein backing up the standby database does not initiate a switch operation at the primary database to transfer online redo log records to an archived redo log file.

2. The method of claim 1, wherein the action of backing up the standby database comprises:
stopping redo apply at the standby database;
checking for a fuzzy file at the standby database;
copying the standby database datafiles to the backup storage device;
copying the archived redo log files to the backup storage device; and
starting redo apply at the standby database.

3. The method of claim 2, wherein the fuzzy file is identified by identifying a datafile that contains a block whose system change number (SCN) is more recent than the SCN of a file header.

4. The method of claim 2, wherein identification of a fuzzy file causes back up processing to fail out with a later restart.

5. The method of claim 1, wherein the action of backing up the standby database comprises:
stopping redo apply at the standby database;
checking for a fuzzy file at the standby database;
starting archived redo apply at the standby database;
copying the standby database datafiles to the backup storage device;
copying the archived redo log files to the backup storage device;
stopping archived redo apply at the standby database; and
starting the redo apply at the standby database.

6. The method of claim 1, wherein physical replication is implemented to such that the standby database corresponds to a block-by-block replica of the primary database.

7. A system for backing up a database in a database system, comprising:

a primary database that generates redo records;
a standby database that receives a copy of the redo records from the primary database, the standby database comprising a processor and a memory for holding programmable code, wherein the programmable code includes instructions executable by the processor receiving a request to back up the standby database and backing up the standby database by copying standby database datafiles and archived redo log files to a backup storage device, wherein backing up the standby database does not initiate a switch operation at the primary database to transfer online redo log records to an archived redo log file.

8. The system of claim 7, wherein the programmable code includes further instructions executable by the processor to perform: stopping redo apply at the standby database; checking for a fuzzy file at the standby database; copying the standby database datafiles to the backup storage device; copying the archived redo log files to the backup storage device; and starting redo apply at the standby database.

9. The system of claim 8, wherein the fuzzy file is identified by identifying a datafile that contains a block whose system change number (SCN) is more recent than the SCN of a file header.

10. The system of claim 8, wherein identification of a fuzzy file causes back up processing to fail out with a later restart.

11. The system of claim 7, wherein the programmable code includes further instructions executable by the processor to perform: stopping redo apply at the standby database; checking for a fuzzy file at the standby database; starting archived redo apply at the standby database; copying the standby database datafiles to the backup storage device; copying the archived redo log files to the backup storage device; stopping archived redo apply at the standby database; and starting the redo apply at the standby database.

12. The system of claim 7, wherein physical replication is implemented to such that the standby database corresponds to a block-by-block replica of the primary database.

13. A computer program product embodied on a computer readable medium, the computer readable medium having stored thereon a sequence of instructions which, when executed by a processor, executes a method for backing up a database, comprising:
maintaining a database system having a primary database and a standby database, the primary database generating redo records that are copied to the standby database;
receiving a request to back up the standby database; and
backing up the standby database by copying standby database datafiles and archived redo log files to a backup storage device,
wherein backing up the standby database does not initiate a switch operation at the primary database to transfer online redo log records to an archived redo log file.

14. The computer program product of claim 13, wherein the sequence of instructions which, when executed by the processor, further executes the action of backing up the standby database by:
stopping redo apply at the standby database;
checking for a fuzzy file at the standby database;
copying the standby database datafiles to the backup storage device;
copying the archived redo log files to the backup storage device; and
starting redo apply at the standby database.

15. The computer program product of claim 14, wherein the fuzzy file is identified by identifying a datafile that contains a block whose system change number (SCN) is more recent than the SCN of a file header.

16. The computer program product of claim 14, wherein identification of a fuzzy file causes back up processing to fail out with a later restart.

17. The computer program product of claim 13, wherein the sequence of instructions which, when executed by the processor, further executes the action of backing up the standby database by:
   stopping redo apply at the standby database;
   checking for a fuzzy file at the standby database;
   starting archived redo apply at the standby database;
   copying the standby database datafiles to the backup storage device;
   copying the archived redo log files to the backup storage device;
   stopping archived redo apply at the standby database; and
   starting the redo apply at the standby database.

18. The computer program product of claim 13, wherein physical replication is implemented to such that the standby database corresponds to a block-by-block replica of the primary database.

\* \* \* \* \*